US009238263B2

(12) United States Patent
Charbon et al.

(10) Patent No.: US 9,238,263 B2
(45) Date of Patent: Jan. 19, 2016

(54) THERMOCOMPENSATED SPRING AND METHOD FOR MANUFACTURING THE SAME

(71) Applicant: Nivarox-FAR S.A., Le Locle (CH)

(72) Inventors: Christian Charbon, Chézard-St-Martin (CH); Marco Verardo, Les Bois (CH); José Quintana, Le Locle (CH)

(73) Assignee: NIVAROX-FAR S.A., Le Locle (CH)

( * ) Notice: Subject to any disclaimer, the term of this patent is extended or adjusted under 35 U.S.C. 154(b) by 0 days.

(21) Appl. No.: 14/078,730

(22) Filed: Nov. 13, 2013

(65) Prior Publication Data

US 2014/0137411 A1   May 22, 2014

Related U.S. Application Data

(62) Division of application No. 12/819,947, filed on Jun. 21, 2010, now Pat. No. 8,641,023.

(30) Foreign Application Priority Data

Jun. 19, 2009   (EP) ..................................... 09163283
Aug. 31, 2009   (CH) ..................................... 1343/09

(51) Int. Cl.
*G04B 17/22*   (2006.01)
*B21F 3/00*   (2006.01)
*F16F 1/02*   (2006.01)

(52) U.S. Cl.
CPC . *B21F 3/00* (2013.01); *F16F 1/024* (2013.01); *G04B 17/227* (2013.01); *F16F 2222/02* (2013.01); *Y10T 29/49609* (2015.01)

(58) Field of Classification Search
CPC .............. B21F 3/00; B21F 3/08; B21F 35/04; G04B 17/227; G04B 17/063; G04B 17/066; F16F 1/024; F16F 2222/02; F16F 1/10; Y10T 29/49609
USPC .................................. 29/896.3, 896.31, 896.9
See application file for complete search history.

(56) References Cited

U.S. PATENT DOCUMENTS

| 1,977,458 | A | 10/1934 | Stargardter |
| 2,257,521 | A | 10/1950 | Bloom |

(Continued)

FOREIGN PATENT DOCUMENTS

| CH | 327796 | 3/1958 |
| EP | 1 039 352 A1 | 9/2000 |

(Continued)

OTHER PUBLICATIONS

Search Report issued in corresponding application No. EP09163283, completed Oct. 27, 2009.

(Continued)

*Primary Examiner* — David Bryant
*Assistant Examiner* — Jun Yoo
(74) *Attorney, Agent, or Firm* — Griffin and Szipl PC

(57) ABSTRACT

The invention relates to a method of manufacturing a spring for a timepiece, including the following steps: (a) forming a body using first and second metallic materials secured to each other; (b) decreasing the section of the body; and winding the body to form the spring. The invention also relates to the spring obtained via the method. The invention concerns the field of regulating members for timepieces.

14 Claims, 3 Drawing Sheets

(56) References Cited

U.S. PATENT DOCUMENTS

| | | | |
|---|---|---|---|
| 2,647,743 | A | 8/1953 | Cook |
| 2,795,519 | A | 6/1957 | Angel et al. |
| 3,007,239 | A | 11/1961 | Lermont |
| 3,187,416 | A * | 6/1965 | Tuetey et al. ............... 29/896.3 |
| 3,291,474 | A | 12/1966 | Clarke |
| 5,881,026 | A | 3/1999 | Baur et al. |
| 6,843,594 | B1 | 1/2005 | Moteki et al. |
| 7,018,092 | B2 | 3/2006 | Muller |
| 7,077,562 | B2 | 7/2006 | Bourgeois et al. |
| 7,726,872 | B2 | 6/2010 | Levingston |
| 8,147,127 | B2 | 4/2012 | Silva |
| 8,333,501 | B2 | 12/2012 | Levingston |
| 2002/0167865 | A1 | 11/2002 | Tokoro et al. |
| 2002/0191493 | A1 | 12/2002 | Hara |
| 2004/0174775 | A1 | 9/2004 | Muller |
| 2006/0055097 | A1 | 3/2006 | Conus et al. |
| 2007/0133355 | A1 | 6/2007 | Hara et al. |
| 2007/0140065 | A1 | 6/2007 | Levingston |
| 2009/0016173 | A1 | 1/2009 | Hessler et al. |
| 2010/0290320 | A1 * | 11/2010 | Gygax et al. ............... 368/177 |

FOREIGN PATENT DOCUMENTS

| | | |
|---|---|---|
| EP | 1 422 436 A1 | 5/2004 |
| WO | 20091/068091 A1 | 6/2009 |
| WO | WO 2009068091 A1 * | 6/2009 |

OTHER PUBLICATIONS

Espacenet-Bibiographic data corresponding to EP 1 039 352 A1, last updated Mar. 13, 2013, filed in parent application as Exhibit A.

Ni-SPAN-C® Alloy 902 1-12 (Special Metals Corp. 2004), filed in parent application as Exhibit B.

Illustrated Professional Dictionary of Horology I+II 87 and 228-231 (2002), filed in parent application as Exhibit C.

* cited by examiner

THERMOCOMPENSATED SPRING AND METHOD FOR MANUFACTURING THE SAME

This application is a Divisional Application of U.S. Ser. No. 12/819,947, filed Jun. 21, 2010, which claims priority from European Patent Application No. 09163283.6, filed Jun. 19, 2009 and Swiss Patent Application No. 01343/09 filed Aug. 31, 2009, the entire disclosures of which are incorporated herein by reference.

FIELD OF THE INVENTION

The invention relates to a spring for a sprung balance and more particularly a spring of this type whose thermo-elastic coefficient is approximately zero and virtually insensitive to magnetic fields. The thermo-elastic coefficient (CTE) of a body represents the relative Young's modulus variation of the body as a function of temperature.

BACKGROUND OF THE INVENTION

Seeking the lowest possible variation of rate for a mechanical timepiece movement is known. However, it is very difficult to achieve this particularly because of the sensitivity of the sprung balance assembly to variations in temperature and magnetic fields.

EP Patent No. 1 039 352 discloses an alloy balance spring made of a particular alloy, whose external surface has an oxide coating. The document discloses a balance spring, which is thermocompensated, i.e., its thermoelastic coefficient, also called the Young's modulus thermal coefficient, remains approximately close to zero, and whose sensitivity to magnetic fields is very low. However, the spring is very difficult to implement, which leads to a very high reject rate and cost price.

SUMMARY OF THE INVENTION

It is an object of the present invention to overcome all or part of the aforecited drawbacks by proposing a thermocompensated spring for a sprung balance whose implementation is simplified.

The invention therefore relates to a thermocompensated spring for a sprung balance comprising a section that includes a first metallic material, characterized in that at least one of the surfaces of the section has an external layer including a second metallic material, whose thermoelastic coefficient varies in the opposite direction to that of the first material.

Advantageously according to the invention, the spring is very simple and can thus use conventional materials, which avoids complex manufacturing steps.

According to other advantageous features of the invention:
at least two parallel surfaces, or at least two adjacent surfaces, or all of the surfaces of the section include the external layer,
the external layer runs over all or part of the length of the spring,
at least one of the metallic materials is paramagnetic,
the second material is a stainless steel,
the first materials is a FeMn alloy or FeNi36 alloy of the invar type,
the section has several different external layers.

The invention also concerns a timepiece including at least one spring that conforms with one of the preceding variants.

Finally, the invention relates to a method of manufacturing a spring for a timepiece that includes the following steps:

a) forming a body using first and second metallic materials secured to each other, wherein the thermoelastic coefficients of the first and second materials vary in opposite directions,
b) decreasing the section of the body,
c) winding the body to form the spring.

It is thus clear that the spring can be obtained with materials very simply, using well-mastered mechanical steps that allow a very low reject rate.

According to other advantageous features of the invention:
between step b) and step c), the method includes step d): changing the section of the body into a polygonal section;
after step c) the method includes step e): raising the outer coil of the spring so as to form a Breguet spring;
the method includes step f): removing matter from the body after the spring has been formed so as to adjust the thermoelastic coefficient thereof;
the method includes final step g): performing a heat treatment after the spring has been formed so as to adjust the thermoelastic coefficient and shape of the spring;
according to a first embodiment, step a) includes phase h): forming a bar made of a first metallic material, phase i): forming a tube made of a second metallic material, phase j): fitting the bar into the tube, and phase k): securing the bar in the tube;
during step j), the method includes a step of cooling the bar and/or heating the tube so as to increase the spaces between these two elements in order to facilitate step j);
by way of alternative, step a) includes the phases of forming a component made of a first metallic material, securing a second metallic material to the component by overmolding, plating, cold and/or hot deformation, bonding and/or welding;
step b) is achieved via hot and/or cold deformation;
the external section of the body at the end of step a) is comprised between 5 and 100 mm and, at the end of step c), between 10 μm and 1 mm;
at least one of the materials is paramagnetic.

An alternative consists in proposing a method of manufacturing a spring for a sprung balance that includes the following steps:

a') forming a spring-shaped body using a first metallic material;
b') securing a second metallic material to the body by overmolding and/or plating, with the thermoelastic coefficients of the first and second materials varying in opposite directions.

It is thus clear that the shape of the spring can be obtained with a very high level of precision using a first material, then, using well mastered steps of overmolding and/or plating a second material, a very high quality thermocompensated spring can be obtained with a very low reject rate.

According to other advantageous features of the alternative:
step a') is achieved by a wire drawing-laminating-winding-heat treatment setting process or by deep reactive ion etching a plate of the first metallic material or by a LIGA type electroforming process;
step b') is achieved by casting, galvanoplasty or physical or chemical vapour phase deposition;
the method includes step f): removing matter from the body after the spring has been formed so as to adjust the thermoelastic coefficient thereof;

the method includes final step g): performing a heat treatment after the spring has been formed so as to adjust the thermoelastic coefficient and shape of the spring;

at least one of the materials is paramagnetic.

Thus, in accordance with a first non-limiting illustrative embodiment of the present invention, a thermocompensated spring for a sprung balance is provided that includes a section with a first metallic material, wherein at least one of the surfaces of the section has an external layer including a second metallic material, whose thermoelastic coefficient varies in the opposite direction to that of the first metallic material. In accordance with a second non-limiting illustrative embodiment of the present invention, the first non-limiting embodiment is modified so that at least two parallel surfaces of the section include the external layer. In accordance with a third non-limiting illustrative embodiment of the present invention, the first non-limiting embodiment is modified so that at least two adjacent surfaces of the section include the external layer. In accordance with a fourth non-limiting illustrative embodiment, the first non-limiting embodiment is modified so that the external layer covers each of the surfaces of the section. In accordance with a fifth non-limiting illustrative embodiment of the present invention, the first non-limiting embodiment is modified so that the external layer runs over the entire length of the spring. In accordance with a sixth non-limiting illustrative embodiment of the present invention, the first non-limiting embodiment is modified so that the external layer runs over one part of the length of the spring.

In accordance with a seventh non-limiting illustrative embodiment of the present invention, the first non-limiting embodiment is modified so that the second material is a stainless steel. In accordance with an eighth non-limiting illustrative embodiment of the present invention, the first non-limiting embodiment is modified so that the first material is a FeMn alloy. In accordance with a ninth non-limiting embodiment of the present invention, the first non-limiting embodiment is modified so that the first material is an invar type FeNi36 alloy. In accordance with a tenth non-limiting illustrative embodiment of the present invention, the first non-limiting embodiment is modified so that at least one of the metallic materials is paramagnetic. In accordance with an eleventh non-limiting illustrative embodiment of the present invention, the first non-limiting embodiment is modified so that the section has several different external layers. In accordance with a twelfth non-limiting, illustrative embodiment of the present invention, a timepiece is provided that includes at least one spring according to the first non-limiting embodiment.

In accordance with a thirteenth non-limiting illustrative embodiment of the present invention, a method of manufacturing a spring for a sprung balance is provided that including the following steps: (a) forming a body using first and second metallic materials secured to each other, with the first and second materials having thermoelastic coefficients that vary in opposite directions; (b) decreasing the section of the body; and (c) winding the body to form the spring. In accordance with a fourteenth non-limiting embodiment of the present invention, the thirteenth non-limiting embodiment is modified so that between step (b) and (c), the method includes the following step: (d) changing the section of the body into a polygonal section. In accordance with a fifteenth non-limiting, illustrative embodiment of the present invention, the thirteenth embodiment is modified so that after step (c), the method includes the following step: (d) raising the outer coil of the spring to form a Breguet overcoil spring.

In accordance with a sixteenth non-limiting illustrative embodiment of the present invention, the thirteenth non-limiting embodiment is modified so that step (a) includes the following phases: (i) forming a bar in a first metallic material; (ii) forming a tube in a second metallic material; (iii) fitting the bar inside the tube; and (iv) securing the bar to the tube. In accordance with a seventeenth non-limiting illustrative embodiment of the present invention, the sixteenth non-limiting embodiment is modified so that the method further includes, during step (j), a phase of cooling the bar and/or heating the tube to increase the spaces between the bar and tube in order to facilitate step (j).

In accordance with an eighteenth non-limiting, illustrative embodiment of the present invention, the thirteenth non-limiting embodiment is modified so that step (a) includes the following phases: (i) forming a part in a first metallic material; and (ii) securing a second metallic material onto the part by overmoulding and/or plating. In accordance with a nineteenth non-limiting, illustrative embodiment of the present invention, the thirteenth non-limiting embodiment is modified so that step (a) includes the following phases: (i) forming a part in a first metallic material; and (ii) securing a second metallic material onto the part by cold and/or hot deformation. In accordance with a twentieth non-limiting, illustrative embodiment of the present invention, the thirteenth non-limiting embodiment is modified so that step (a) includes the following phases: (i) forming a part in a first metallic material; and (ii) securing a second metallic part onto the part by bonding and/or welding. In accordance with a twenty-first non-limiting, illustrative embodiment of the present invention, the thirteenth non-limiting embodiment is modified so that step (b) is achieved by a cold and/or hot deformation process.

In accordance with a twenty-second non-limiting illustrative embodiment of the present invention, the thirteenth non-limiting embodiment is modified so that the external section of the body at the end of step (a) is comprised between 5 and 100 mm. In accordance with a twenty-third non-limiting, illustrative embodiment of the present invention, the thirteenth non-limiting embodiment is modified so that the external section of the body at the end of step (c) is comprised between 10 μm and 1 mm.

In accordance with a twenty-fourth non-limiting illustrative embodiment of the present invention, a method of manufacturing a spring for a sprung balance is provided, wherein the method includes the following steps: (a') forming a spring-shaped body using a first metallic material; and (b') securing a second metallic material to the body by overmoulding and/or plating, with the first and second metallic materials having thermoelastic coefficients that vary in opposite directions. In accordance with a twenty-fifth non-limiting illustrative embodiment of the present invention, the twenty-fourth non-limiting embodiment is modified so that step (a') is achieved by a wire drawing-laminating-winding-heat setting treatment. In accordance with a twenty-sixth non-limiting illustrative embodiment of the present invention, the twenty-fourth non-limiting embodiment is modified so that step (a') is achieved by deep reactive ion etching in a plate of the first metallic material. In accordance with a twenty-seventh non-limiting illustrative embodiment of the present invention, the twenty-fourth non-limiting embodiment is modified so that step (a') is achieved by a LIGA type electroforming process. In accordance with a twenty-eighth non-limiting, illustrative embodiment of the present invention, the twenty-fourth non-limiting embodiment is modified so that step (b') is achieved by casting, galvanoplasty or physical or chemical vapour deposition.

In accordance with a twenty-ninth non-limiting, illustrative embodiment of the present invention, the thirteenth non-limiting embodiment is modified so that it includes the following step: (f) removing matter from the body after the spring has been formed so as to adjust the thermoelastic coefficient thereof. In accordance with a thirtieth non-limiting, illustrative embodiment of the present invention, the thirteenth non-limiting embodiment is modified so that it includes the following final step: (f) performing a heat treatment after the spring has been formed so as to adjust the thermoelastic coefficient and shape of the spring. In accordance with a thirty-first non-limiting, illustrative embodiment of the present invention, the thirteenth non-limiting embodiment is modified so that at least one of the materials is paramagnetic.

When broadly construed, however, the present invention pertains to a method of manufacturing a spring for a timepiece including the following steps: (a) forming a body using first and second metallic materials secured to each other; (b) decreasing the section of the body; and (c) winding the body to form the spring. The invention also relates to the spring obtained via the method. The invention concerns the field of regulating members for timepieces.

BRIEF DESCRIPTION OF THE DRAWINGS

Other features and advantages will appear clearly from the following description, given by way of non-limiting indication, with reference to the accompanying Figures, which include.

DETAILED DESCRIPTION OF PREFERRED EMBODIMENTS

The invention relates to a thermocompensated spring for a timepiece regulating member of the sprung balance type. The spring according to the invention uses materials that can be worked using conventional metal shaping methods. Moreover, the materials used are ordinary and thus inexpensive.

According to the invention, the thermoelastic coefficient of the spring is made approximately zero, i.e. it has an approximately zero relative Young's modulus variation as a function of temperature. To achieve this end, two overlapping metallic materials are used, whose respective thermoelastic coefficients vary in opposite directions so that they compensate for each other. It is thus clear that if one of the materials has a positive thermoelastic coefficient, the second will have a negative thermoelastic coefficient.

Figure 2:
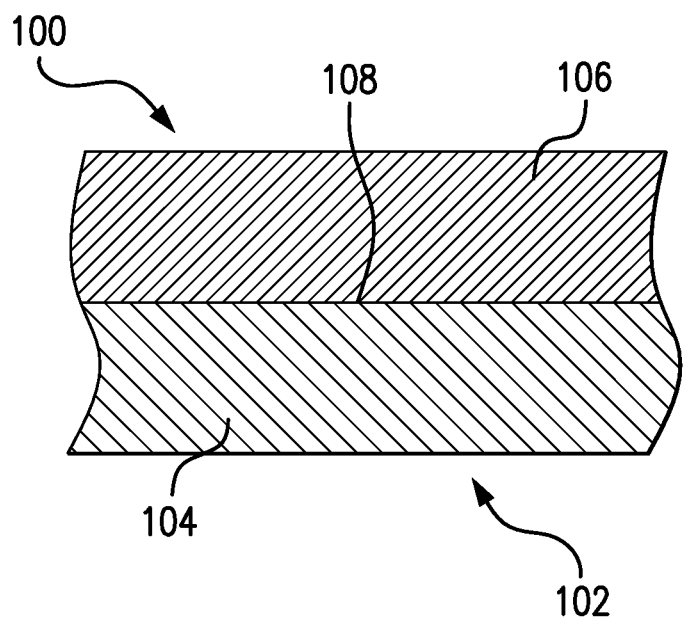
FIG. 2, which schematically illustrates a thermocompensated spring in accordance with another embodiment of the present invention.
Figure 4:
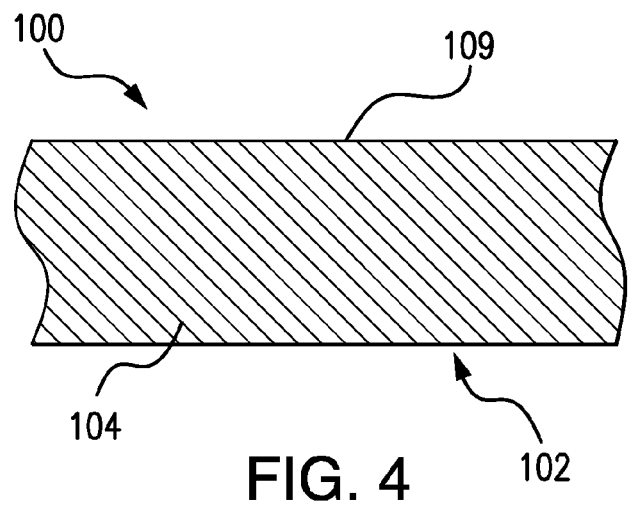
FIG. 4 schematically illustrates a portion of a thermocompensated spring, such as shown in FIG. 2, wherein this portion does not include an external layer.

As shown in FIG. 2, a thermocompensated spring (100), in accordance with the present invention, includes a section (102) that has a first metallic material (104), wherein at least one surface (108) of the section (102) has an external layer (106) that includes a second metallic material, and which is formed on at least one surface (108) of the first metallic material (104). As evident from FIG. 2, the external layer (106) may run over the entire length of the spring (100). However, as evident from FIG. 4, the section (102) of the thermocompensated spring (100) may have a part (109) that is not provided with the external layer so that it is within the scope of the present invention that the external layer (106) runs over one part of the length of the spring (100), but not over the entire length of the spring.

Figure 3:
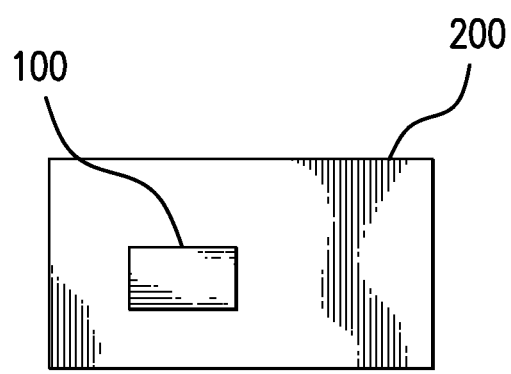
FIG. 3, which schematically illustrates a timepiece provided with a thermocompensated spring, in accordance with another embodiment of the present invention.

As shown in FIG. 3, a timepiece (200) is provided, in accordance with the present invention, which includes the spring (100).

It is of no import whether the material with a positive thermoelastic coefficient covers the other, or vice versa. It is only the thickness of the overlap or coating that has to be adapted in accordance with the thickness covered and, also in accordance with the type of balance so as to compensate overall for the sprung balance regulating member.

The overlap or coating of the materials can be partial or total. Thus, at least two parallel or adjacent surfaces of the section of the body of the first material can be provided with the second material. Likewise, the overlap or coating can be over all or part of the length of the body of the first material. It is also clear that each surface can also include a material that is specific thereto, i.e. it can comprise not merely one second material. Finally, at least one of the materials may be paramagnetic so as to make the spring virtually insensitive to magnetic fields.

Preferably, the spring uses the following pair of materials: stainless steel—FeMn alloy or stainless steel—invar type FeNi36 alloy. Which material covers which is not necessarily important. However, if one of the two materials is ferromagnetic, the core (104) preferably uses the ferromagnetic material. Thus, for the above examples, the core (104) preferably uses the FeMn alloy (antiferromagnetic) or FeNi36 (ferromagnetic) and the outer layer (106) is steel (antiferromagnetic). It will also be noted that this configuration also limits any oxidation of the spring.

In order to calculate the respective thicknesses of the core (material 1) relative to the external layer (material 2), we calculate the desired corrected thermoelastic coefficient CTE' and the desired corrected torque C' for adaptation thereof to a balance in accordance with the following relations, where the expansion coefficients are deemed to be the same:

$$CTE' = \frac{A \cdot E_1 \cdot CTE_1 + B \cdot E_2 \cdot CTE_2}{A \cdot E_1 + B \cdot E_2} \quad (1)$$

$$C' = \frac{(A \cdot E_1 + B \cdot E_2) \cdot (h + 2d) \cdot (e + 2d)^3}{12L} \quad (2)$$

where:

$$A = \frac{h \cdot e^3}{(e + 2d)^3 \cdot (h + 2d)} \quad (3)$$

$$B = \frac{h \cdot [(e + 2d)^3 - e^3] + 2d \cdot (e + 2d)^3}{(e + 2d)^3 \cdot (h + 2d)} \quad (4)$$

And:

$E_x$ is the Young's modulus of material x;
$CTE_x$ is the thermoelastic coefficient of material x;
e is the thickness of the core;
h is the height of the core;
d is the thickness of the external layer.

Figure 5:
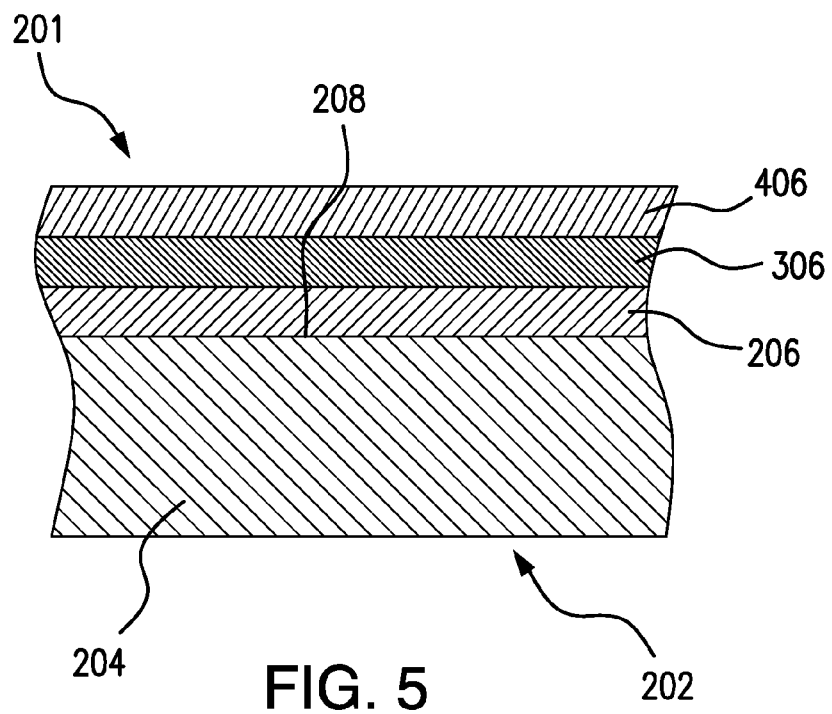
FIG. 5 schematically illustrates another embodiment of a thermocompensated spring in accordance with the present invention.

Of course, the invention is not limited to the stainless steel—FeMn alloy or stainless steel—FeNi36 alloy pair. Thus other pairs could be envisaged. By way of example, the external layer (106) can comprise stainless steel and/or chromium and/or nickel and/or iron. Likewise, by way of example, the spring core (104) can comprise niobium, NbZr alloy, CrMn alloy, FeMn alloy, FeNi36 alloy or AuPd alloy. Furthermore, the external layer is not limited to a single layer. As shown in FIG. 5, the thermocompensated spring (201) is provided with a section (202) that has several different external layers (206), (306), (406) formed on at least one surface (208) of a first metallic material (204) of the section (202).

The method 1 of manufacturing the above spring will now be explained with reference to FIG. 1. Method 1 preferably includes three main steps respectively step 11 of forming a body using first and second metallic materials secured to each other, step 15 of decreasing the section of the body and step 21 of winding the body to form the spring.

Formation step 11 generally includes phases 3, 5, 7 and 13, which are used for several embodiments. According to a first embodiment, the body is formed from a bar and a tube. In first phase 3 of method 1, the bar of a first material is formed. In a second phase 5 of method 1, which can be performed in parallel, prior to or after phase 3, the tube of a second material is formed. Then, in a third phase 7, the bar is fitted inside the tube. Preferably, the difference in section between the exterior of the bar and the hollow of the tube is as small as possible, so as to limit any relative movements.

Thus, in order to facilitate performance of phase 7, an optional phase 9 is preferably provided before phase 7. Phase 9 consists in performing a heat treatment of the bar and/or tube so as to guarantee the largest possible space, i.e. difference in section between the bar and tube. It is thus clear that heating to expand the tube and/or cooling to contract the bar can be envisaged. After phase 7, step 11 continues with the fourth phase 13 for securing the bar inside the tube. It is thus clear that this first embodiment involves covering the entire section of the core of the first material.

One could also envisage only covering some surfaces. Thus, in another embodiment, phases 3 and 5 are still performed to form first and second materials. In third and fourth phases 7, 13, the two materials are respectively brought together and then secured to each other. In a non-limiting manner, in this other embodiment, phase 13 can include cold and/or hot deformation but also bonding and/or welding.

Of course, other formation steps 11 are also possible, including more or fewer phases 3, 5, 7, 9 and 13. Thus, according to an alternative, phase 3 is used to form a body in a first material, and then in a second phase 5, a second material is overmoulded or plated. It is thus clear that phases 5, 7 and 13 can be performed at the same time, for example, by casting, galvanoplasty or physical or chemical vapour phase deposition.

The second step 15 is for decreasing the section of the spring to the desired section. By way of example, the largest section of the body can thus pass from 5 to 100 mm at the end of step 11 to a final dimension of between 10 μm and 1 mm.

It is also perfectly possible to envisage performing steps 11, 15 and 21 in a different order. Indeed, it is also possible to form only the first material in a first phase in accordance with steps 11, 15 and 21, and then to form the second material, as in the above alternative, in a phase 5 in which the first material is overmoulded and/or plated with a second material.

By way of example, the shape of the spring could be given to the first material, which can thus be obtained via a wire drawing-laminating-winding-heat setting treatment or by deep reactive ion etching a plate of the first material or by a LIGA type electroforming process (galvanic growth in a photosensitive resin mould). The first material can then be coated, as in the above alternative, by casting, galvanoplasty or by physical or chemical vapour deposition.

Preferably, for the first embodiment of the invention, phase 13 and step 15 are performed in a single plastic deformation process. Thus the deformation caused advantageously enables the bar and tube to be secured to each other, but also enables the section to be reduced to that of the future spring. Preferably, the deformation process is cold and/or hot, possibly with intermediate annealing phases to allow the material to be deformed to very small dimensions.

Thus, for all the embodiments, step 15 can include cold deformations, which may include wire drawing and/or drawing and/or forging and or lamination and/or embossing. Likewise, by way of example, hot deformations could also be envisaged and may include drawing and/or forging and/or lamination and/or embossing.

Preferably, after step 15, method 1 can also include an additional step 17 for giving the spring section its final shape. Thus, in step 17, the section of the body is changed into a polygonal section, such as, for example, a rectangular section. This step 17 is preferably performed by lamination so as to obtain very advantageous dimensional tolerances.

Method 1 continues with step 21, in which the body is wound to form the spring, for example, approximately in the shape of a spiral. According to the invention, step 21 can end method 1. However, other variants are possible.

Thus, a third optional step 23 can be provided after step 21 so as to raise the outer coil of the spring formed in step 21. This step 23 can thus form a Breguet type overcoil. According to the invention, optional step 23 can also end method 1.

However, after step 21 or 23, method 1 can also continue with step 31 and/or 33. Thus, as illustrated in FIG. 1 in double lines, after step 21 or 23, method 1 can include step 33 for performing a heat treatment in order to adjust the thermoelastic coefficient and shape of the spring. According to the invention, step 33 can also end method 1.

Figure 1:
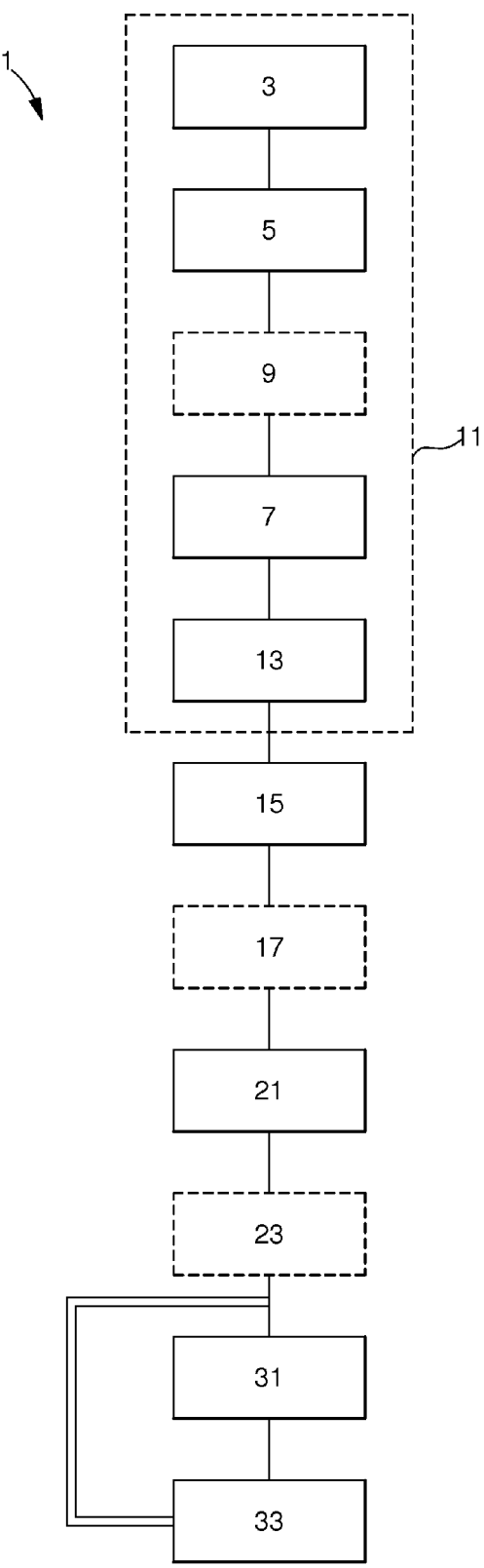
FIG. 1, which shows a flow chart of a method of manufacturing of a spring according to the invention.

Nonetheless, step 33 can be replaced or preceded by step 31, as illustrated by a single line in FIG. 1. Step 31 is for removing matter from the body after the spring has been formed, i.e. after step 21 or 23, so as to adjust the thermoelastic coefficient of the spring. Step 31 can, for example, include a machining and/or chemical etch phase. According to the invention, it is clear that step 31 can also end method 1 and/or be used for determining the excess thickness to be removed on the next batch.

Of course, the present invention is not limited to the example illustrated, but is capable of various variants and alterations that will be clear to those skilled in the art. Thus, other hot and/or cold deformation steps could be envisaged.

What is claimed is:

1. A method of manufacturing a spring for a sprung balance, wherein the method includes the following steps:
    (a) forming a body having a first metallic material and a second metallic material secured to each other, with the first metallic material and the second metallic material having thermoelastic coefficients that vary in opposite directions;
    (b) decreasing a section of the body; and
    (c) winding the body to form said spring.

2. The method according to claim 1, wherein between step (b) and step (c), the method includes the following additional step:
    (d) changing the section of said body into a polygonal section.

3. The method according to claim 1, wherein after step (c), the method includes the following step:
   (d) raising an outer coil of said spring to form a Breguet overcoil spring.

4. The method according to claim 1, wherein step (a) includes the following phases:
   i. forming a bar in the first metallic material;
   ii. forming a tube in the second metallic material;
   iii. fitting the bar inside the tube; and
   iv. securing the bar to the tube.

5. The method according to claim 4, wherein the method includes, during step iii, a phase of cooling the bar, or heating the tube, or cooling the bar and heating the tube, to increase spaces between said bar and tube in order to facilitate step iii.

6. The method according to claim 1, wherein step (a) includes the following phases:
   i. forming a part in the first metallic material; and
   ii. securing the second metallic material onto the part by overmoulding, or by plating, or by overmoulding and plating.

7. The method according to claim 1, wherein step (a) includes the following phases:
   i. forming a part in the first metallic material; and
   ii. securing the second metallic material onto the part by cold deformation, or by hot deformation, or by cold deformation and hot deformation.

8. The method according to claim 1, wherein step (a) includes the following phases:
   i. forming a part in the first metallic material; and
   ii. securing the second metallic material onto the part by bonding, or by welding, or by bonding and welding.

9. The method according to claim 1, wherein step (b) is achieved by a cold deformation process, or by a hot deformation process, or by the combination of the cold deformation process and the hot deformation process.

10. The method according to claim 1, wherein an external section of the body at the end of step (b) is between 5 and 100 mm in a dimension.

11. The method according to claim 1, wherein an external section of the body at the end of step (c) is between 10 μm and 1 mm in a dimension.

12. The method according to claim 1, wherein the method includes the following step:
    (d) removing matter from the body after the spring has been formed so as to adjust the thermoelastic coefficient of the body of the spring.

13. The method according to claim 1, wherein the method includes the following final step:
    (d) performing a heat treatment after the spring has been formed so as to adjust a thermoelastic coefficient and shape of the spring.

14. The method according to claim 1, wherein at least one of the first metallic material and the second metallic material is paramagnetic.

\* \* \* \* \*